(12) United States Patent
Schlarb et al.

(10) Patent No.: US 8,819,075 B2
(45) Date of Patent: Aug. 26, 2014

(54) FACILITATION OF EXTENSION FIELD USAGE BASED ON REFERENCE FIELD USAGE

(75) Inventors: Uwe Schlarb, Ostringen (DE); Rene Dehn, Sinsheim (DE); Daniel Niehoff, Sandhausen (DE); Stefan A. Baeuerle, Rauenberg (DE); Bernhard Thimmel, Edingen-Neckarhausen (DE); Matthias Lehr, Weinheim a.d.B. (DE); Karsten Fanghänel, Schwetzingen (DE); Klaus Rauer, Alsbach-Haehnlein (DE)

(73) Assignee: SAP AG, Walldorf (DE)

( * ) Notice: Subject to any disclaimer, the term of this patent is extended or adjusted under 35 U.S.C. 154(b) by 626 days.

(21) Appl. No.: 12/843,291

(22) Filed: Jul. 26, 2010

(65) Prior Publication Data

US 2012/0023130 A1    Jan. 26, 2012

(51) Int. Cl.
*G06F 17/30* (2006.01)
(52) U.S. Cl.
USPC ............................................ 707/802
(58) Field of Classification Search
CPC ............... G06F 9/30181; G06F 9/342; G06F 17/30421; G06F 17/30896; G06F 2212/7207; G06F 3/1265; G06F 3/126
USPC ................... 707/769, 802, 804, 805, 999.102
See application file for complete search history.

(56) References Cited

U.S. PATENT DOCUMENTS

| | | | |
|---|---|---|---|
| 7,318,066 B2* | 1/2008 | Kaufman et al. ..................... 1/1 |
| 2005/0021536 A1 | 1/2005 | Fiedler et al. |
| 2005/0172261 A1* | 8/2005 | Yuknewicz et al. .......... 717/106 |
| 2005/0183002 A1* | 8/2005 | Chapus ........................ 715/505 |
| 2005/0229186 A1 | 10/2005 | Mitchell et al. |
| 2006/0206507 A1* | 9/2006 | Dahbour ....................... 707/100 |
| 2006/0225032 A1* | 10/2006 | Klerk et al. .................... 717/105 |
| 2006/0230066 A1* | 10/2006 | Kosov et al. ............... 707/104.1 |
| 2006/0294141 A1 | 12/2006 | Tsang et al. |
| 2007/0088716 A1 | 4/2007 | Brumme et al. |
| 2007/0239711 A1* | 10/2007 | Unnebrink et al. ............... 707/6 |
| 2008/0005623 A1 | 1/2008 | Said |
| 2008/0027893 A1* | 1/2008 | Cavestro et al. .................. 707/1 |
| 2008/0109436 A1 | 5/2008 | Klein et al. |
| 2008/0162622 A1 | 7/2008 | Becker et al. |

(Continued)

FOREIGN PATENT DOCUMENTS

EP    1 494 131 A1    1/2005
WO    2005/098593 A2   10/2005

OTHER PUBLICATIONS

Joseph W. Yoder et al., "Architecture and Design of Adaptive Object-Models", ACM SIGPLAN Notices, XP-002249967, vol. 36, No. 12, Dec. 2001, pp. 50-60 (total 11 pgs.).

(Continued)

*Primary Examiner* — Mohammed R Uddin
(74) *Attorney, Agent, or Firm* — Buckley, Maschoff & Talwalkar LLC

(57) ABSTRACT

A system may include presentation, to a user, of a consuming business entity including a reference field of a business object, reception of an instruction from the user to add an extension field to the consuming business entity based on the reference field of the business object, determination of a second consuming business entity including the reference field of the business object, and presentation of the second consuming business entity to the user.

17 Claims, 14 Drawing Sheets

(56) References Cited

U.S. PATENT DOCUMENTS

| | | | |
|---|---|---|---|
| 2008/0163253 A1 | 7/2008 | Massmann et al. | |
| 2008/0195964 A1* | 8/2008 | Randell | 715/772 |
| 2008/0275844 A1* | 11/2008 | Buzsaki et al. | 707/3 |
| 2008/0319942 A1* | 12/2008 | Courdy et al. | 707/3 |
| 2009/0281853 A1* | 11/2009 | Misvaer et al. | 705/7 |
| 2010/0057504 A1 | 3/2010 | Baeuerle et al. | |
| 2010/0057771 A1 | 3/2010 | Baeuerle et al. | |
| 2010/0057776 A1 | 3/2010 | Baeuerle et al. | |
| 2010/0161648 A1 | 6/2010 | Eberlein et al. | |
| 2010/0162147 A1 | 6/2010 | Ritter et al. | |

OTHER PUBLICATIONS

"European Search Report", dated Oct. 13, 2009, for European Application No. 09011280.6, 2pgs.

Willis, G. "Architecture SIG—Feb. 2007", Internet Article, [Online], Feb. 2007, XP002552304, [retrieved on Oct. 26, 2009], Retrieved from the Internet: URL: http://www.acs.org.au/nsw/sigs/architecture/Architecture-200702.pdf>, (pp. 1-44, total 44 pages).

Mary Taylor et al., "Data Integration and Composite Business Services, Part 3: Build a multi-tenantdata tier with access control and security", Internet Article, [Online], Dec. 13, 2007, XP002552301, [retrieved on Oct. 26, 2009], Retrieved from the Internet: URL: http://www.ibm.com/developerworks/data/library/techarticle/dm-0712taylor/>, (pp. 1-16, total 16 pages).

"Non-Final Office Action", mailed Dec. 23, 2010, for U.S. Appl. No. 12/198,315, entitled "Dynamic Node Extension Fields for Business Objects", filed Aug. 26, 2008, 10pgs.

"Non-Final Office Action", mailed Dec. 23, 2010, for U.S. Appl. No. 12/198,351, entitled "Dynamic Node Extensions and Extension Fields for Business Objects", filed Aug. 26, 2008, 11pgs.

"Non-Final Office Action", mailed Mar. 23, 2011, for U.S. Appl. No. 12/339,328, entitled "Ui-Driven Biding of Extension Fields for Business Objects", filed Dec. 19, 2008, 22pgs.

"Final Office Action", mailed May 11, 2011, for U.S. Appl. No. 12/198,315, entitled "Dynamic Extension Fields for Business Objects", filed Aug. 26, 2008, 5pgs.

"Final Office Action", mailed May 11, 2011, for U.S. Appl. No. 12/198,351, entitled "Dynamic Node Extensions and Extension Fields for Business Objects", filed Aug. 26, 2008, 7pgs.

"Non-Final Office Action", mailed Aug. 1, 2011, for U.S. Appl. No. 12/339,392, entitled "Flexiable Multi-Tenant Support of Metadata Extensions", filed Dec. 19, 2008, 20pgs.

"Non-Final Office Action", mailed Aug. 16, 2011, for U.S. Appl. No. 12/198,392, entitled "Functional Extensions for Business Objects", filed Aug. 26, 2008, 10pgs.

"Final Office Action", mailed Oct. 4, 2011, for U.S. Appl. No. 12/339,328, entitled "UI-Driven Biding of Extension Fields for Business Objects", filed Dec. 19, 2008, 16pgs.

"Final Office Action", mailed Jan. 9, 2012, for U.S. Appl. No. 12/339,392, entitled "Flexible Multi-Tenant Support of Metadata Extensions", filed Dec. 19, 2008, 26pgs.

"Non-Final Office Action" mailed May 9, 2012, for U.S. Appl. No. 12/339,328, entitled "UI-Driven Binding of Extension Fields to Business Objects", filed Dec. 19, 2008, 28pgs.

* cited by examiner

Sales_Order_UI — 500

| Reference Field | Path | Business Object | BO Node |
|---|---|---|---|
| ROOT_ID | HEADER_ID | SALES_ORDER | ROOT |
| ITEM_ID | ITEM[]-ID | SALES_ORDER | ITEM |
| COUNTRY | SALES_ORDER_UI-COUNTRY_CODE | SALES_ORDER | GEO |

*FIG. 5*

Supplier_Fact_Sheet_Form — 600

| Reference Field | Path | Business Object | BO Node |
|---|---|---|---|
| NAME | FORM_SUPPLIER_FACT_SHEET-SUPPLIER_NAME | SUPPLIER | CONTACT |
| COUNTRY | FORM_SUPPLIER_FACT_SHEET-COUNTRY_CODE | SALES_ORDER | GEO |

*FIG. 6*

Inventory_UI — 700

| Reference Field | Path | Business Object | BO Node |
|---|---|---|---|
| ROOT_ID | UI_INVENTORY-INVENTORY_ID | INVENTORY | ROOT |
| ITEM_ID | UI_INVENTORY-INVENTORY_ITEM_ID | INVENTORY | ITEM |
| COUNTRY | UI_INVENTORY-COUNTRY_CODE | SALES_ORDER | GEO |

FACILITATION OF EXTENSION FIELD USAGE BASED ON REFERENCE FIELD USAGE

FIELD

Some embodiments relate to business objects within a business process platform. More specifically, some embodiments relate to the inclusion of extension fields within consuming business entities of a business process platform.

BACKGROUND

A business object is a software model representing real-world elements of business transactions. For example, a business object may represent a business document such as a sales order, a purchase order, or an invoice. A business object may also represent master data objects such as a product, a business partner, or a piece of equipment. Particular ones of such master data objects (e.g., SALES_ORDER SO435539, ACME corporation) are represented by instances of their representing business object, or business object instances.

A business object may specify business logic and/or data having any suitable structure. A business platform provider (e.g., SAP AG®) may provide a software solution including many business objects for a particular business scenario. The business platform provider may design the structure of the business objects based on the requirements of the business scenario.

A customer deploying such a software solution might use pre-defined user interfaces to interact with the business objects. Often, however, a customer will want to customize these user interfaces based on the business needs of the customer. For example, a customer may wish to change a user interface associated with a SALES_ORDER business object by adding a "Sub-Product Identifier" field next to an existing "Product Identifier" field.

In order to maintain internal consistency of the software solution, this change requires modification of the user interface and of the SALES_ORDER business object. In particular, the SALES_ORDER business object is modified to include the extension field "Sub-Product Identifier". Commonly-assigned co-pending U.S. patent application Ser. No. 12/339,328, entitled "UI-Driven Binding Of Extension Fields To Business Objects", describes systems for facilitating the above-described change. The contents of U.S. patent application Ser. No. 12/339,328 are incorporated herein by reference for all purposes.

A customer-added extension field is available for consumption by other elements within the software solution. These elements include, but are not limited to, other user interfaces, print forms, and service interfaces. However, a customer typically does not possess the advanced technical skill required to incorporate the extension field within these elements. In fact, the customer is typically unable to even identify elements which might be suited for consumption of the customer-added extension field.

Improved systems for utilizing added extension fields are desired.

BRIEF DESCRIPTION OF THE DRAWINGS

FIG. 5 is a tabular representation of a mapping path according to some embodiments.

FIG. 6 is a tabular representation of a mapping path according to some embodiments.

FIG. 7 is a tabular representation of a mapping path according to some embodiments.

FIG. 9 is a view of a user interface to describe creation of an extension field according to some embodiments.

FIG. 10 is a view of a user interface to describe creation of an extension field according to some embodiments.

FIG. 11 is a view of a user interface to describe creation of an extension field according to some embodiments.

FIG. 14 is a view of a user interface to describe further usage of an extension field according to some embodiments.

DETAILED DESCRIPTION

Figure 1:
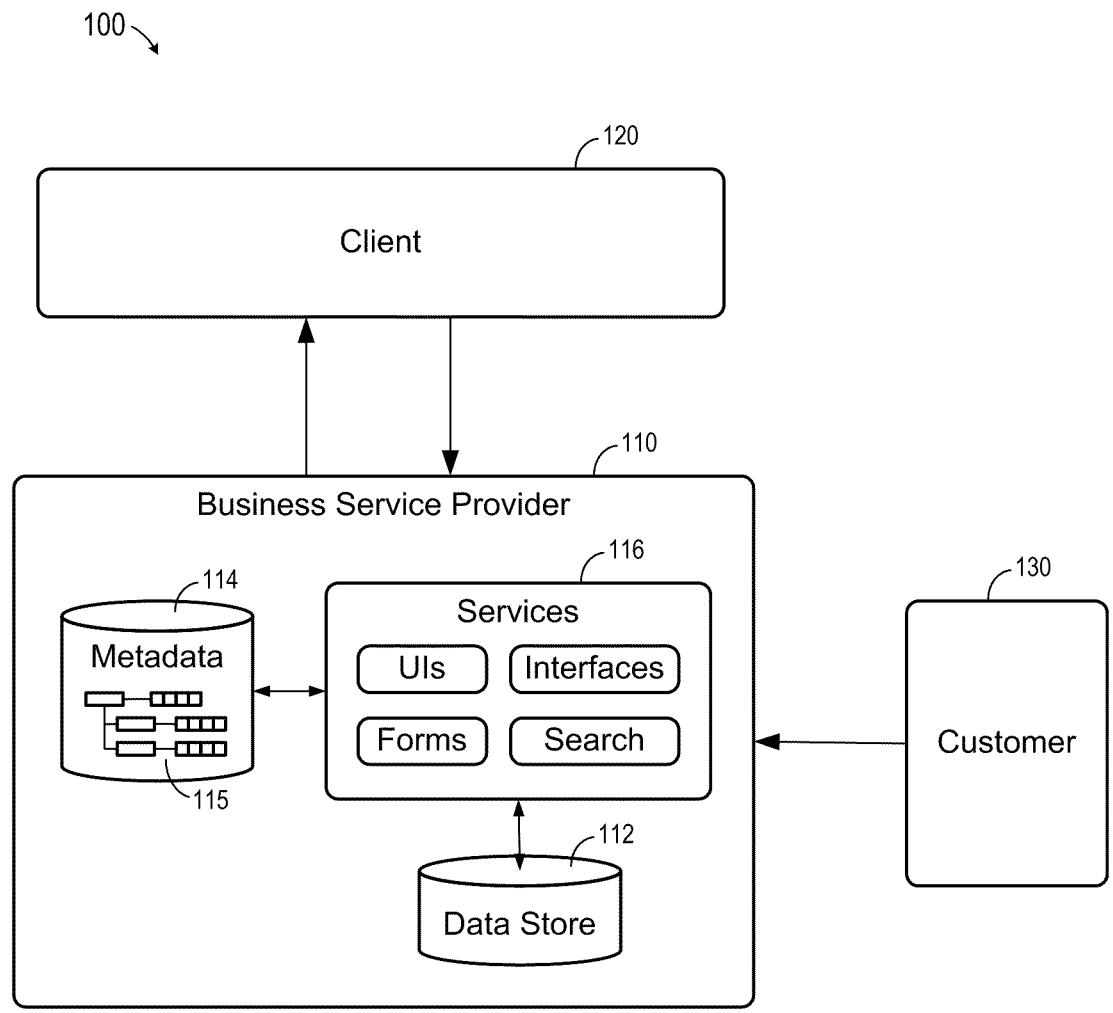
FIG. 1 is a block diagram of a system according to some embodiments.

FIG. 1 is a block diagram of system 100 according to some embodiments. System 100 includes business service provider 110 for providing business services to client 120 on behalf of customer 130. For example, customer 130 may represent an enterprise employing business service provider 110 to facilitate business processes, and client 120 may represent any entity (e.g., an employee of customer 130) requiring interaction with business service provider 110 to further the business processes of customer 130.

Business service provider 110 might receive requests from client 120 and provide responses to the client 120 via a service-oriented architecture such as understood by those in the art. The use of remotely-hosted business service provider 110 may help customer 130 avoid the costs and problems associated with maintaining a local, "in house" Enterprise Resource Planning (ERP) system.

Business service provider 110 might store customer information into and retrieve customer information from physical tables of data store 112. Data store 112 may comprise a relational database such as SAP MaxDB, Oracle, Microsoft SQL Server, IBM DB2, Teradata and the like. Alternatively, data store 112 could be a multi-dimensional database, an eXtendable Markup Language (XML) document, or any other structured data storage system. The physical tables may be distributed among several relational databases, dimensional databases, and/or other data sources. To provide economies of scale, data store 112 may include data of more than one customer. Business service provider 110 includes mechanisms to ensure that a client accesses only the data that the client is authorized to access.

The structures of and relationships between the physical database tables may be complex, and business objects may be used to shield developers and end-users from these complexities. A business object may comprise, for example, a software model including nodes to encapsulate related data and methods. As described above, a business object may be associated with a business entity, such as a customer, partner, sales order, product, store, time, etc., represented in the data of a data source. Each instance of a business object may represent a particular instance of the entity represented by the business object. An instance of a SALES_ORDER business object may, for example, provide a mapping to the underlying tables storing data associated with a particular sales order.

Metadata 114 includes information defining the structure and attributes of business objects, such as business object 115. In this regard, business object 115 is an object model, or class. Business object 115 may include reference fields and/or extension fields as will be described below.

Metadata 114 therefore provides information regarding the structure and attributes of the data of underlying business object instances (i.e., the data stored in data store 112). Services 116 use metadata 114 to access data of data store 112. In accordance with this paradigm, an extension field that is modeled within the metadata of a business object allows services 116 to store and retrieve data associated with the extension field.

Services 116 include any business services that are or become known. Services 116 may provide client 120 with user interfaces, print forms, search capabilities, message interfaces (e.g., A2X, B2B), etc. based on data stored in data store 112 and defined by metadata 114. As described above with respect to a change to a user interface, extension fields may be added to these entities in order to retrieve data and provide services including extension field data. For purposes of the present description, entities to which extension fields may be added in order to consume corresponding business object data will be referred to as consuming business entities.

Client 120 may execute a Web browser to access services 116 via HyperText Transport Protocol (HTTP) communication. For example, a user may manipulate a user interface of client 120 to input an instruction (e.g., "show me a sales report"). Client 120, in response, may transmit a corresponding HTTP service request to business service provider 110. Services 116 may conduct any processing required by the request (e.g., generating views and user interfaces) and, after completing the processing, provide a response to client 120.

Client 120 might comprise a Personal Computer (PC) or mobile device executing a Web client. Examples of a Web client include, but are not limited to, a Web browser, an execution engine (e.g., JAVA, Flash, Silverlight) to execute associated code in a Web browser, and/or a proprietary standalone application.

Customer 130 may customize consuming business entities which are provided by business service provider 110. In particular, customer 130 may add an extension field to a user interface (and to its corresponding business object) as described in aforementioned U.S. patent application Ser. No. 12/339,328. Embodiments may facilitate addition of such an extension field to other consuming business entities.

FIG. 1 represents a logical architecture for describing processes according to some embodiments, and actual implementations may include more or different components arranged in other manners. Moreover, each system described herein may be implemented by any number of devices in communication via any number of other public and/or private networks. Two or more of devices of may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a floppy disk, a CD-ROM, a DVD-ROM, a Zip® disk, magnetic tape, and solid state Random Access Memory (RAM) or Read Only Memory (ROM) storage units. Embodiments are therefore not limited to any specific combination of hardware and software.

Figure 2:
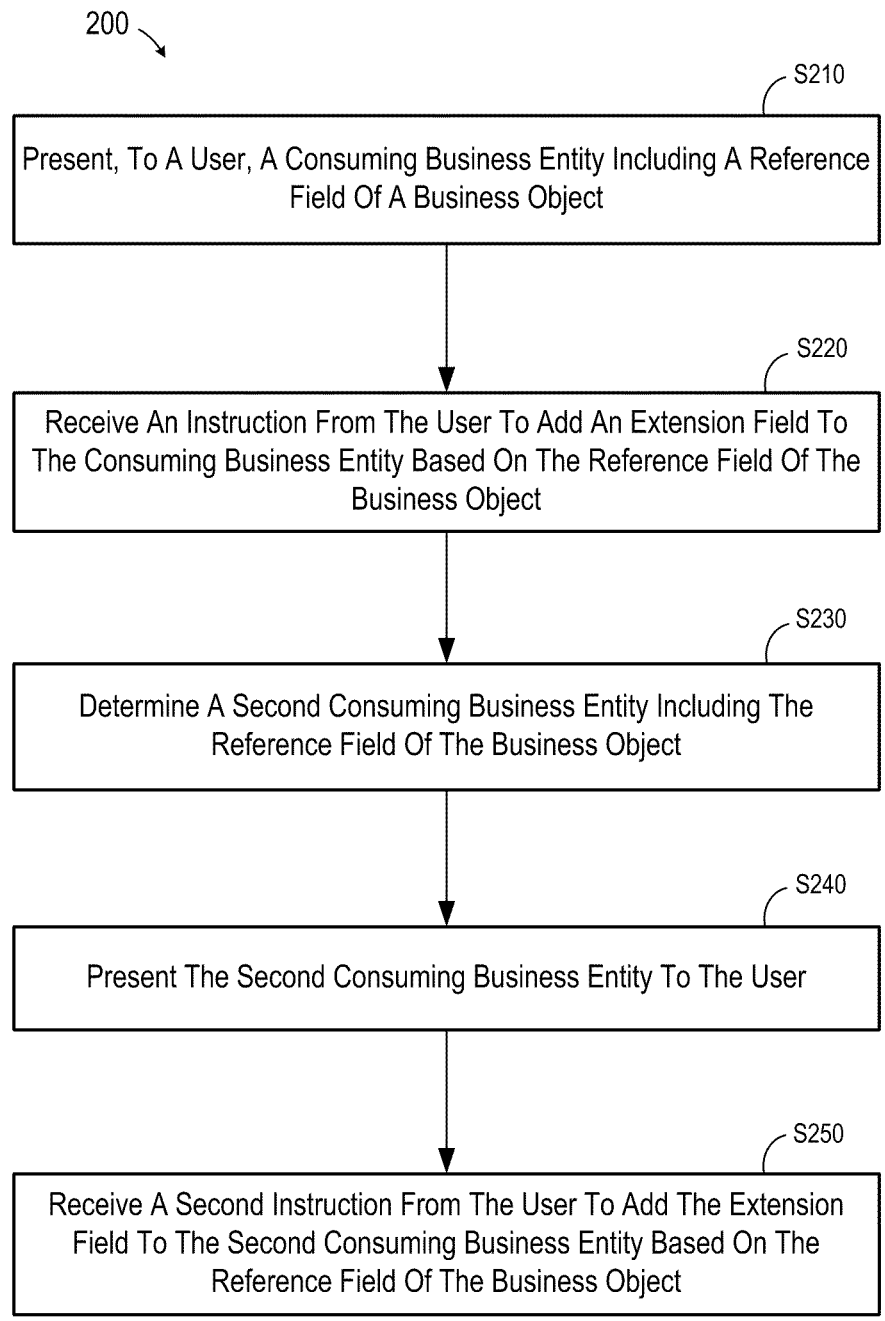
FIG. 2 is a flow diagram of a process according to some embodiments.

FIG. 2 is a flow diagram of a process 200 according to some embodiments. Business service provider 110 and/or client 120 may execute portions of process 200 as will be described below, but embodiments are not limited thereto. In this regard, all processes described herein may be executed by any combination of hardware and/or software. The processes may be embodied in program code stored on a tangible medium and executable by a computer to provide the functions described herein. The processes described herein do not imply a fixed order to their constituent steps, and embodiments may be practiced in any order that is practicable.

Prior to process 200, a developer of a business service provider may define reference fields for various consuming business entities. A reference field definition may point to a specific portion of a consuming business entity (e.g., a location on a user interface) and to a field in the data model of the user interface (i.e., as representing the path down to a corresponding persistent business object node). The definition may also indicate the underlying business object.

According to some embodiments, a reference field bundle includes metadata defining all reference fields within a single consuming business entity. Embodiments are not limited to defining reference fields using metadata of reference field bundles.

Figure 3:
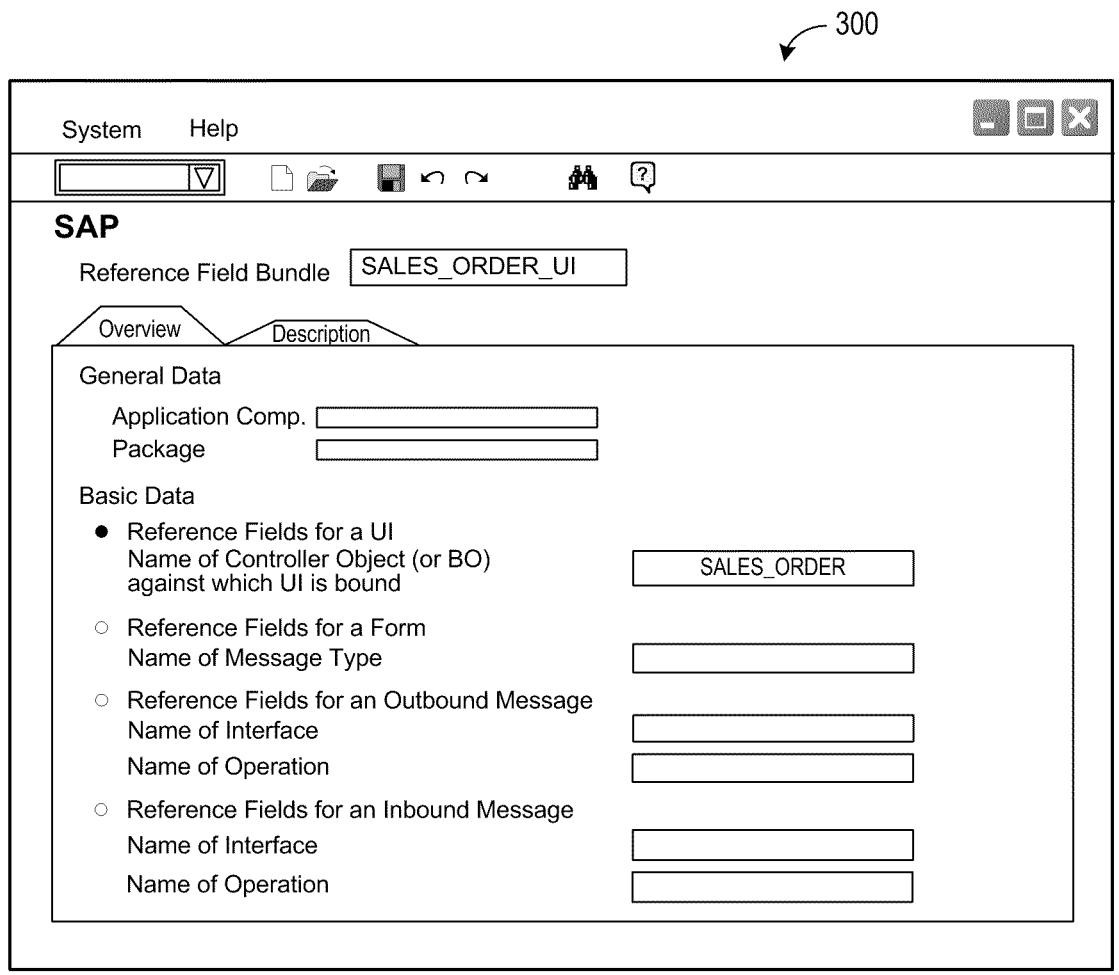
FIG. 3 is a view of a user interface according to some embodiments.

FIG. 3 is an example of interface 300 of a developer tool for creating reference field bundles according to some embodiments. According to the example, a reference field bundle named SALES_ORDER_UI is being created. It will be assumed that the bundle is associated with a user interface entitled SALES_ORDER_UI. In this regard, interface 300 also allows the developer to specify that the reference field bundle will include reference fields for a user interface, and to specify the controller object or business object against which the user interface is bound.

Figure 4:
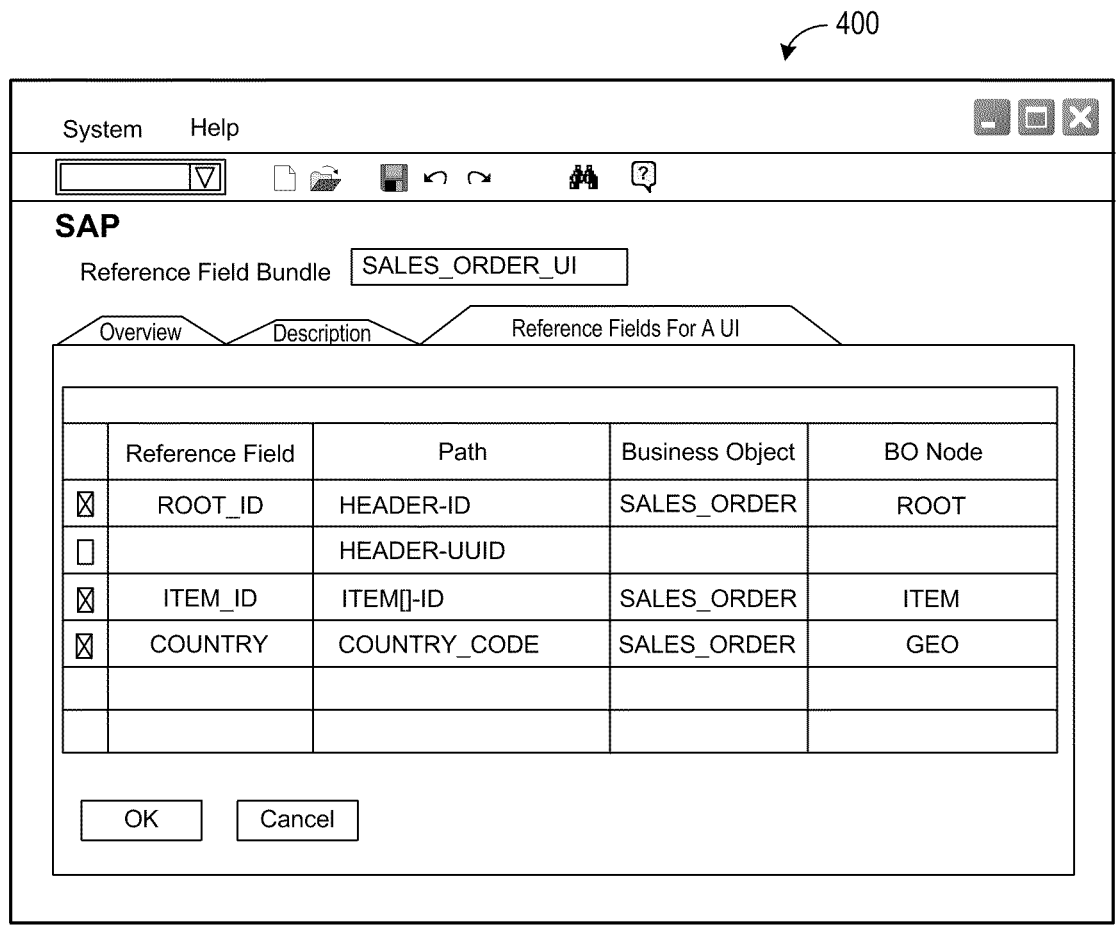
FIG. 4 is a view of a user interface according to some embodiments.

FIG. 4 shows interface 400 of the developer tool of the present example. Interface 400 allows the developer to define each reference field of the reference field bundle specified in interface 300. As shown, the definition of each reference field includes a name of the reference field, a path to a field of the data model of the consuming business entity (i.e., the SALES_ORDER_UI user interface), a name of the associated business object, and a node of the business object including the field data.

Interface 300 also allows for the creation of reference bundles associated with forms, outbound messages and inbound messages. In each case, a reference bundle defines all reference fields within a single consuming business entity (i.e., a form, an outbound message, or an inbound message). The definition of each reference field includes a name of the reference field, a path to a field of the data model of the consuming business entity, a name of the associated business object, and a node of the business object including the field data.

FIGS. 5 through 7 illustrate tabular representations of reference field bundles 500, 600 and 700 according to some embodiments. Reference field bundles 500, 600 and 700 may comprise any type of data structures for specifying mapping paths as described herein. Reference field bundles 500, 600 and 700 may be stored among metadata 114 according to some embodiments.

Reference field bundle 500 reflects the example provided by FIGS. 3 and 4. That is, reference field bundle 500 may be created as a result of the developer actions illustrated in FIGS. 3 and 4. In contrast, reference field bundle 600 defines reference fields for a form. For each reference field, bundle 600 specifies a name, a path to a field of the data model of the consuming business entity (i.e., the SUPPLIER_FACT_SHEET_FORM form), and a name and node of an associated business object. Unlike bundle 500, reference field bundle 600 is associated with two different business objects. Reference field bundle 700 defines reference fields (name, path, business object and node) for another user interface (i.e., INVENTORY_UI).

Each of reference field bundles 500-700 includes the reference field "COUNTRY" associated with the SALES_ORDER business object and the GEO node thereof. In other words, the reference field "COUNTRY" is associated with each of the consuming business entities SALES_ORDER_UI, SUPPLIER_FACT_SHEET_FORM and INVENTORY_UI. These associations are used in some embodiments to determine suggested usages of extension fields which are based on the reference field.

Figure 8:
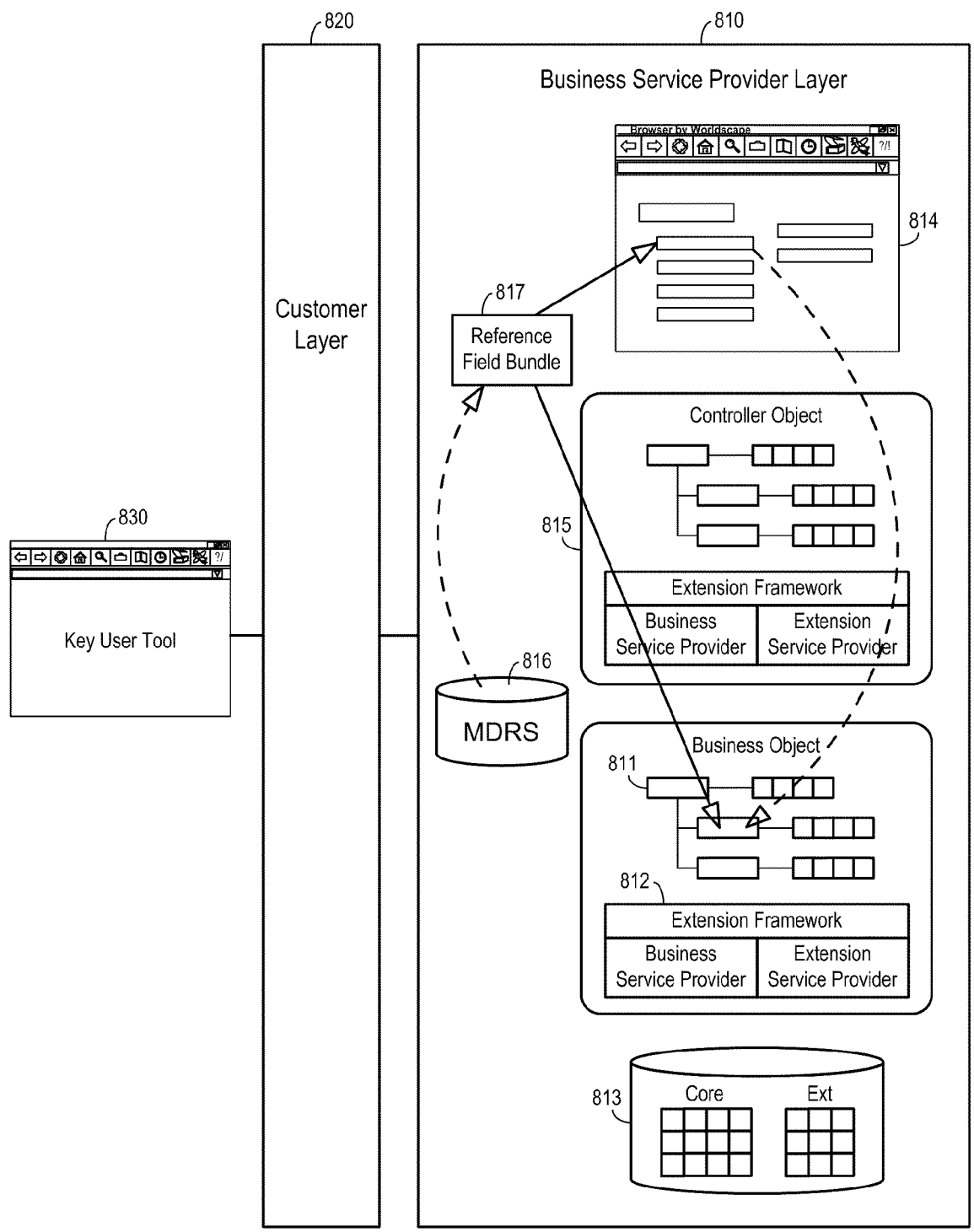
FIG. 8 is a block diagram of a system according to some embodiments.

FIG. 8 is a block diagram of system 800 according to some embodiments. System 800 will be used to describe one implementation of reference field bundles according to some embodiments, as well as to provide an environment in which to describe process 200.

Business services provider layer 810 includes business object 811 and extension framework 812 between business object 811 and core/extension data stored separately in database 813. User interface 814 may access business object 811 via an access mechanism 815 associated with interface 814. Access mechanism 815 could be implemented by, for example, (i) a Frontend Service Adaptation (FSA), (ii) a Controller Object (CO) implementation, (iii) a Business Service Architecture (BSA), (iv) an ABAP platform, (v) a Dynamic Dictionary (DDIC), (vi) manual coding, (vii) a Fast Search Infrastructure (FSA), (viii) a Transformed Object (TO), or (ix) a Transformation Node (TN).

Metadata repository 816 stores reference field bundle 817. Reference field bundle 817 is associated with user interface 814 and maps a displayed element of user interface 814 (i.e., specified by the "path" described above) directly to a node of business object 811. Accordingly, reference field bundle 817 allows easy identification of the node without requiring knowledge of the access mechanism which lies between user interface 814 and business object 811.

A customer may operate key user tool 830 to add an extension field to user interface 814 based on reference field bundle 817. Upon receipt of input from key user tool 830, customer layer 820 creates appropriate metadata describing the extension field.

Process 200 will now be described in the context of a key user tool such as tool 830. In this regard, and returning to FIG. 2, a consuming business entity including a reference field of a business object is presented to a user at S210.

Figure 9:
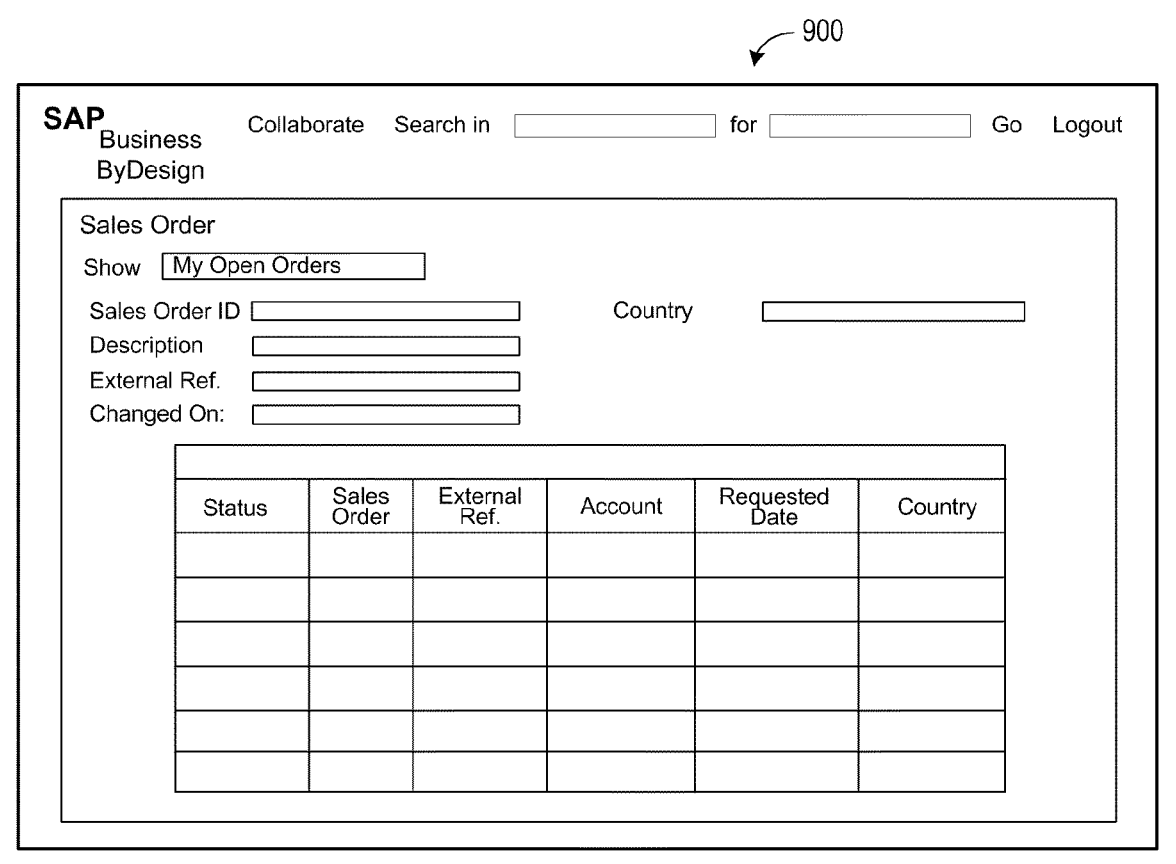

FIG. 9 is an outward view of interface 900 of a key user tool as mentioned above. In some embodiments, FIG. 9 reflects an on-demand Web-based solution in which user interface 900 is displayed by a Web browser. According to the present example, interface 900 is user interface SALES_ORDER_UI associated with a SALES_ORDER business object and including reference field Country as described in the above example of reference field bundle 500.

Embodiments may be used in conjunction with any user interface associated with any one or more business objects. Moreover, the consuming business entity may comprise a user interface, a form, a report, a message, a service interface, etc. The consuming business entity may be presented to the user at S210 in any suitable manner.

Figure 10:
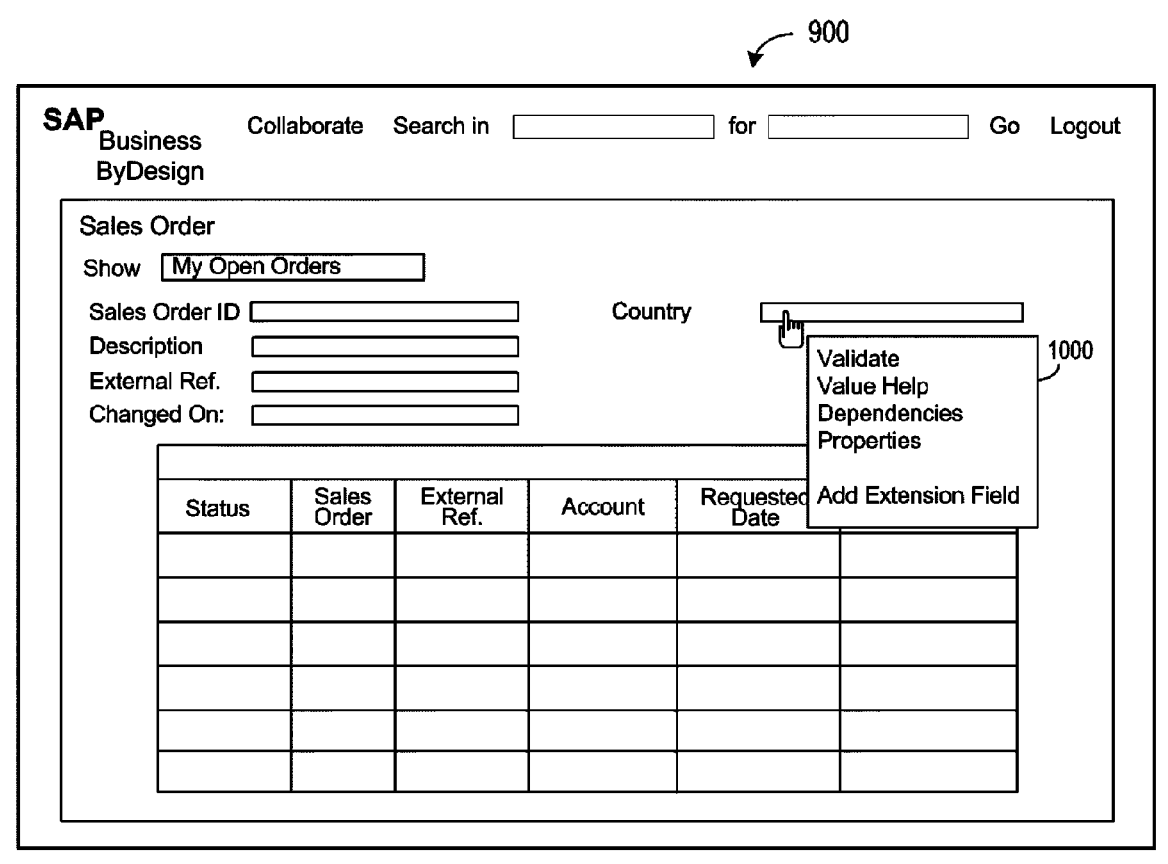

Next, at S220, an instruction to add an extension field to the consuming business entity is received from the user. The extension field is to be added based on a reference field of the consuming business entity (i.e., of the business object). FIG. 10 illustrates user interface 900 and context menu 1000. Context menu 1000 is presented in response to "right-clicking" on the Country field of user interface 900. Context menu 1000 provides several options, one of which is "Add Extension Field". Selection of the "Add Extension Field" option results in reception of the instruction at S220. In some embodiments of S220, the system automatically determines and proposes a reference field by evaluating the existing fields displayed on the screen.

Figure 11:
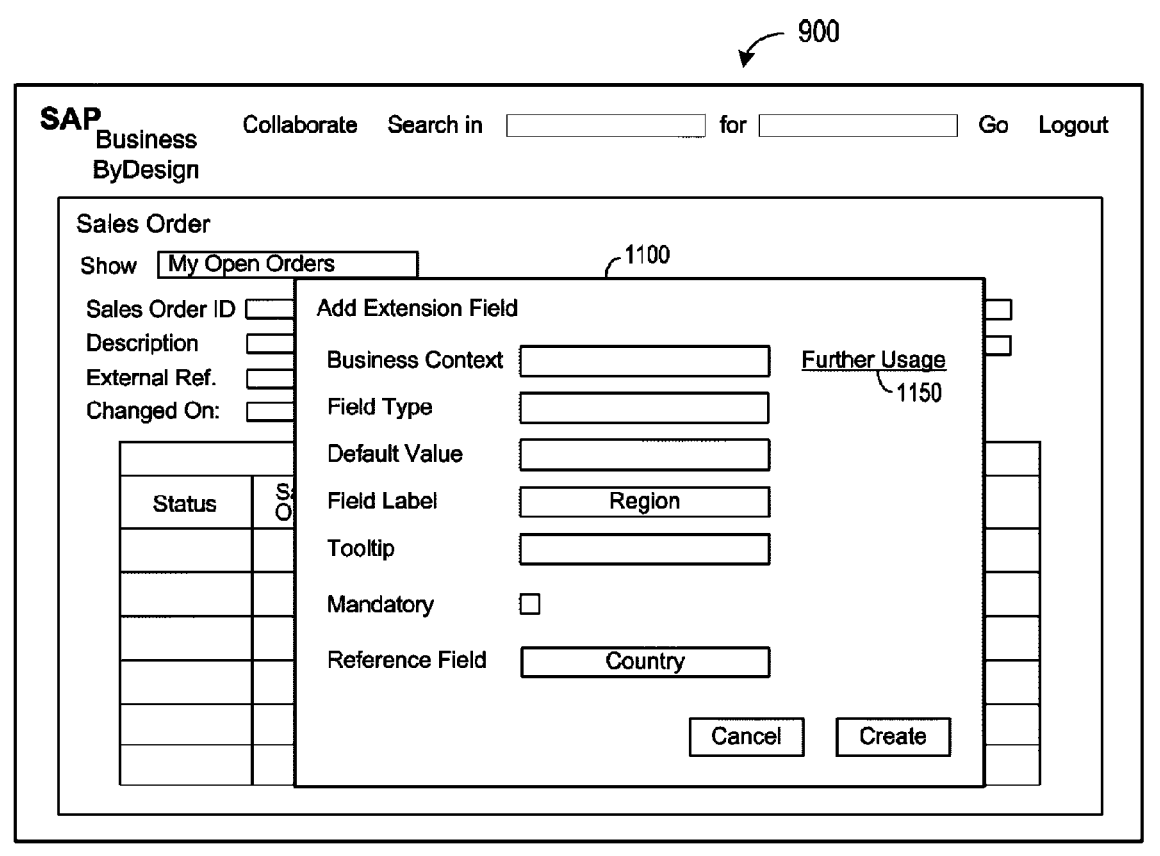

Continuing with the present example, dialog 1100 of FIG. 11 may be presented to a user upon selection of the "Add Extension Field" option at S220. Dialog 1100 includes input fields for specifying a Business Context of the extension field, a Field Type (e.g., string, currency, date, etc.), a Default Value, a Field Label, a Tooltip and a Reference Field. The user has input "Region" as the extension field name. According to the example, the Reference Field input field is pre-populated with "Country" because the Country field was right-clicked at S220. The Reference Field input field may initially be blank or populated with a name of a different default field. The reference field need not be displayed in user interface 11000. Such a situation may occur in a case that the reference field was proposed by the system.

Further attributes of the extension field may also be derived from the reference field. In some embodiments, the properties of the extension field are identical to the properties of the reference field. Alternatively, the properties of the reference field may be derived based on the properties of one or more other fields selected from user interface 900. Any property may be dependent on field values (e.g., "mandatory only in U.S.").

Dialog 1100 also includes Further Usage link 1150. A user may select Further Usage link 1150 to identify other consuming business entities to which the extension field may be added. Flow proceeds from S220 to S230 upon user selection of Further Usage link 1150.

At S230, a second consuming entity is determined including the reference field of the business object. In some embodiments, the second consuming entity may be determined from the reference bundles described above. Specifically, reference bundles of MDRS 816 may be analyzed to identify any reference bundles which include the reference field on which the added extension field is based.

For example, it is assumed that MDRS 816 includes reference field bundles 500 through 700 described above. At S230, reference bundles 600 and 700 are identified because they both include reference field COUNTRY of node SALES_ORDER→GEO. Reference bundle 500 is not identified because it corresponds to the consuming business entity presented at S210.

Figure 12:
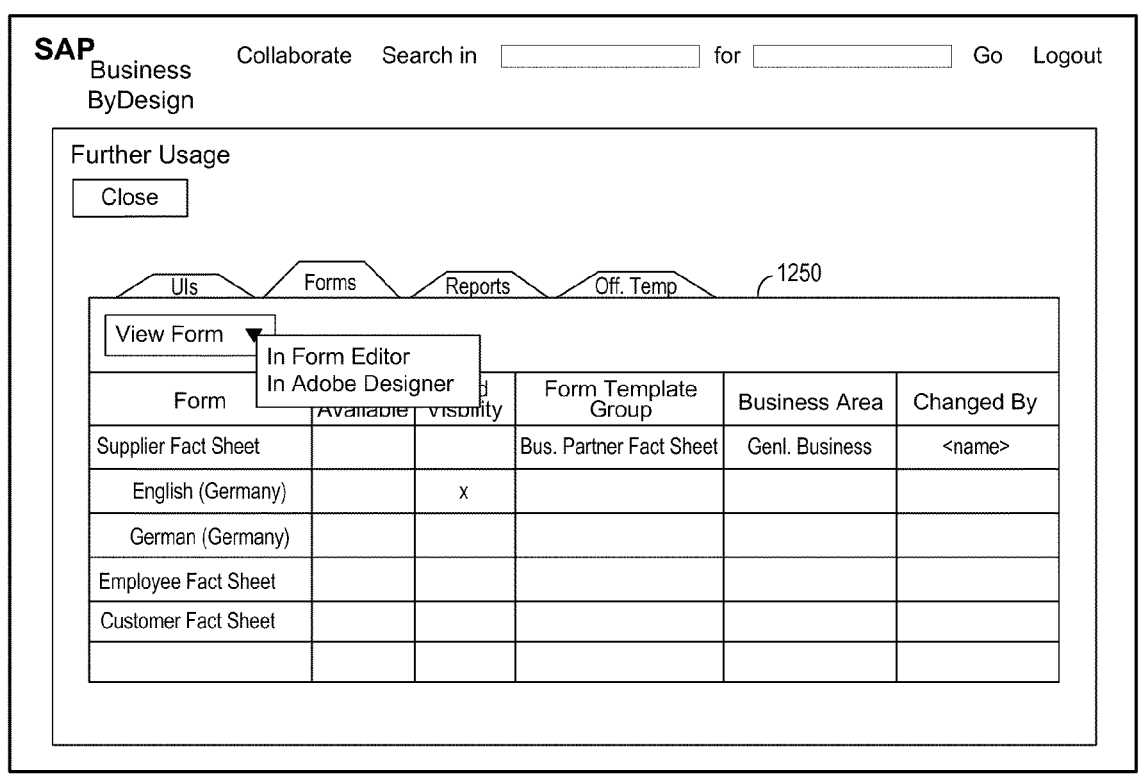
FIG. 12 is a view of a user interface to describe further usage of an extension field according to some embodiments.

A determined second consuming business entity is then presented to the user at S240. The second consuming business entity may be presented in any manner, including those which facilitate modification of the second business entity to add the extension field thereto. FIG. 12 provides an example of an outward view of interface 1200 for displaying additional consuming business entity associated with the reference field according to some embodiments.

Interface 1200 includes tabs dedicated to several types of consuming business entities. Tab 1250 presents forms which have been determined to be associated with the reference field. Also provided is a drop-down menu for use in editing a form (e.g., to add the extension field thereto).

Figure 13:
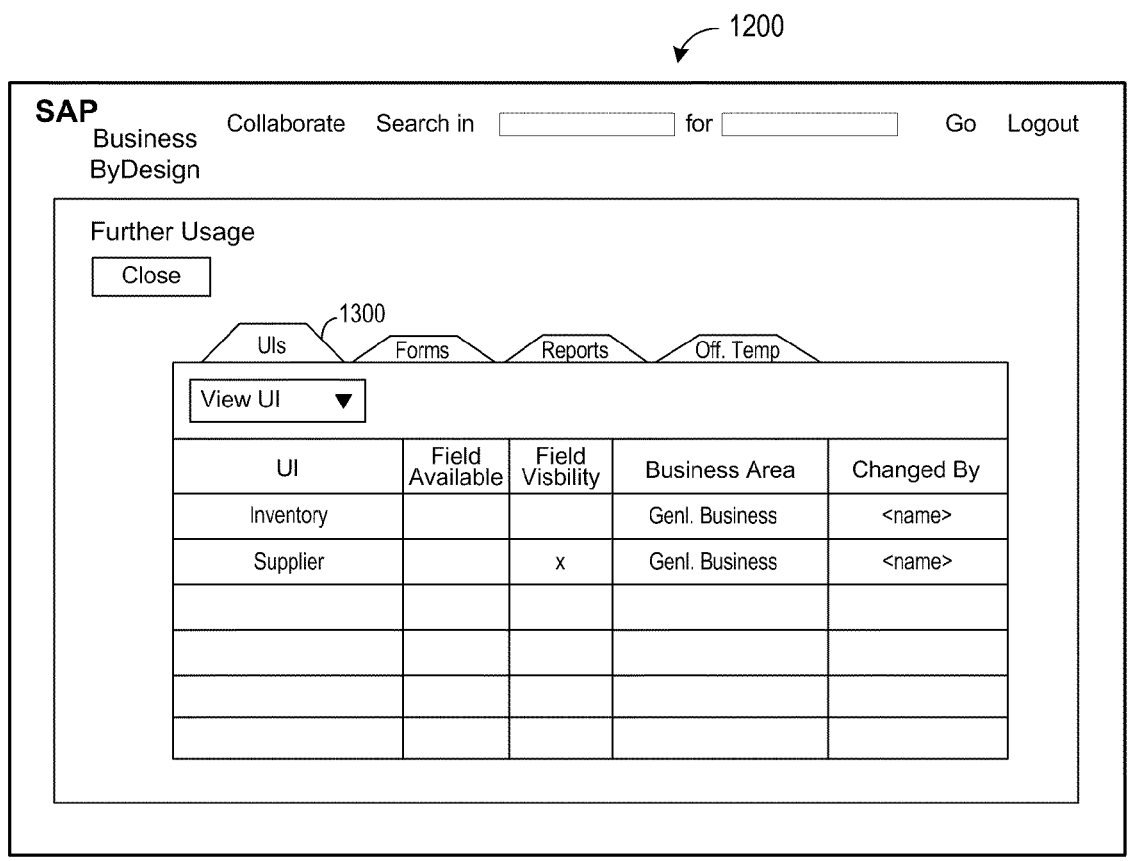
FIG. 13 is a view of a user interface to describe further usage of an extension field according to some embodiments.
Figure 14:
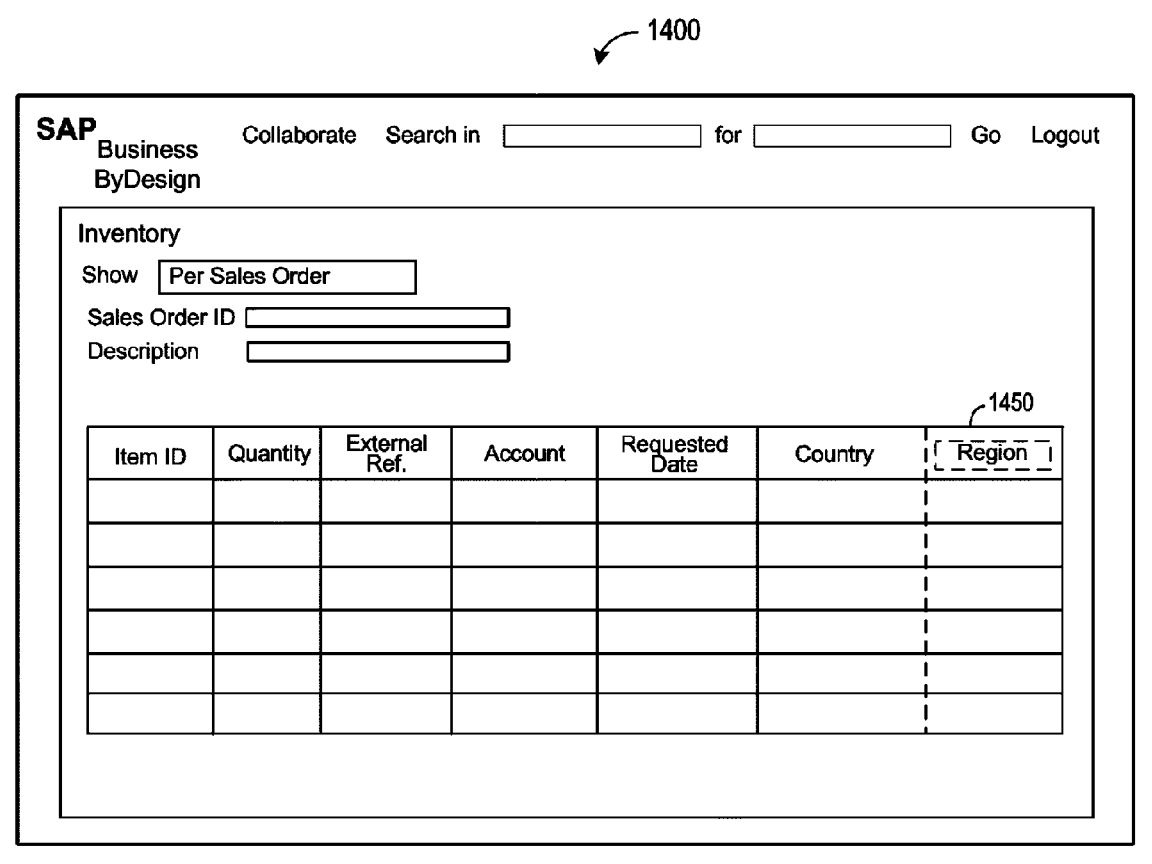

FIG. 13 shows interface 1200 after selection of tab 1300. Tab 1300 presents user interfaces which include the reference field. Accordingly, the user may wish to add the extension field to one or more of the presented user interfaces. For purposes of example, it will be assumed that the user selects the listed "Inventory" user interface, causing display of interface 1400 of FIG. 14.

The user may operate interface 1400 at S250 to issue an instruction to add the extension field to the presented second consuming business entity. Issuance of the instruction may proceed similarly to that described above with respect to interface 900. Specifically, a user may right click on a reference field of interface 1400 to invoke a context menu including an option to add an extension field. FIG. 1400 illustrates an embodiment in which the extension field defined in dialog 1100 is provisionally added as column 1450 to interface 1400 as a result of process 200. This addition may be confirmed by the user via any suitable interface control.

In response to the instructions received at S220 and S250, the extension field may be added to the data models of the corresponding consuming business entities. The extension field is bound to the business object node of the reference field. The extension field may be global (i.e., associated with all users) or specific to any subset(s) of users (e.g., a particular company, a subset of users of a particular company, a particular vendor, etc.).

More specifically, based on input from the key user tool, the following metadata entities may be created: (1) a "field definition" containing type, label, code list, etc.; (2) a "field persistency" object containing the field definition and to which business object node it is logically attached; (3) a "field appearance" object describing that a field described in the "field persistency" object is to be added to a user interface analogous to the reference field; and (4) a "user interface adaptation" object describing the positioning of the new field on the user interface.

When an extension field is activated, a field extensibility generator may create the necessary runtime artifacts (e.g., associated with a generation piece list). Moreover, the metadata entities may be read along with the reference field definition, and, based on the physical field identified via the reference field, it is derived where a new field is to be added (e.g., to which controller/BO node) and/or which runtime models must be extended (e.g., BSA model or FSI model). According to some embodiments, the generated artifacts are only kept local to system 800. They may be re-generated (created, changed, deleted) when the underlying objects are changed (e.g. via an import).

As described above, an extension field may be consumed by forms and service interfaces. Accordingly, forms and service interfaces, as well user interfaces may be presented to a user in response to addition of an extension field to another consuming business entity. However, some embodiments do not support model-driven addition of an extension field to a form or service interface. Rather, hard-coded process agents are used to support forms and service interfaces based on business objects.

Figure 15:
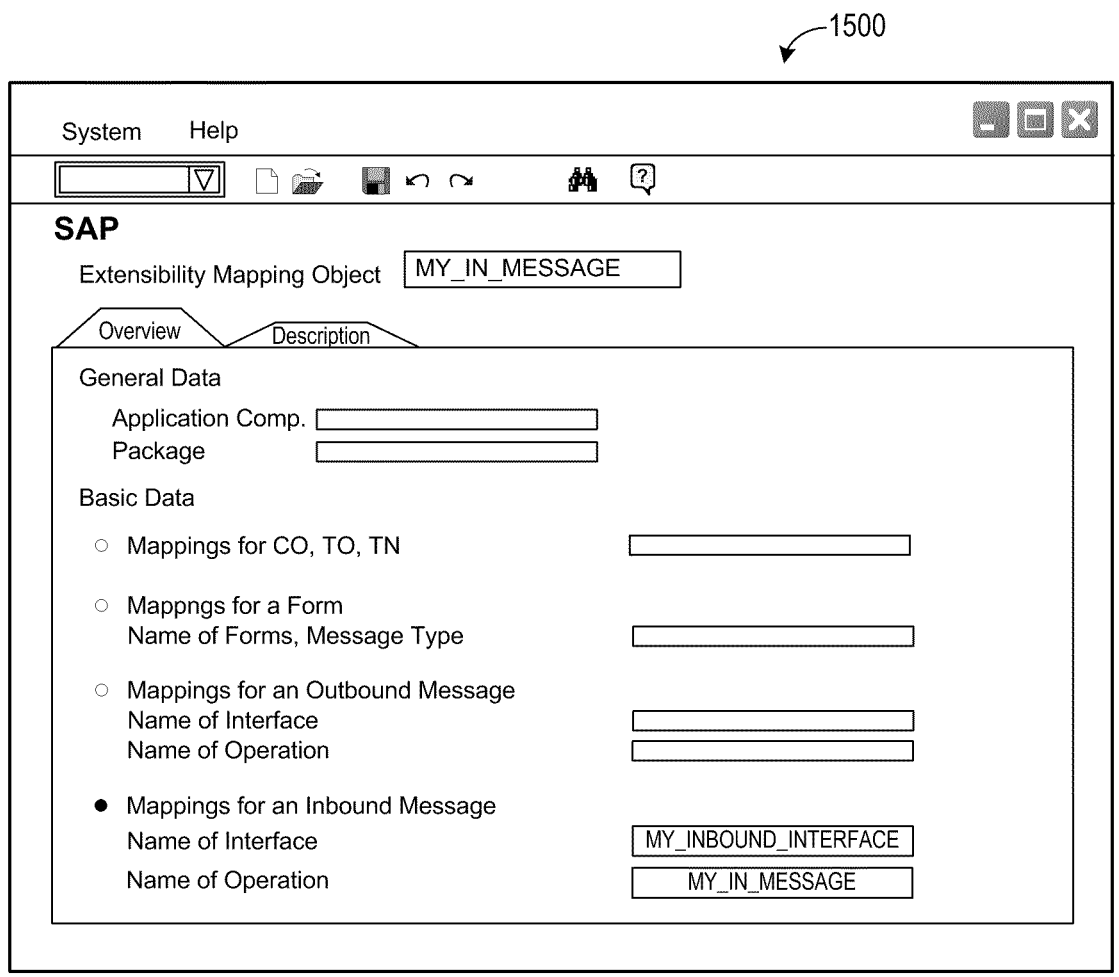
FIG. 15 is a view of a user interface to define an extensibility mapping object according to some embodiments.

FIG. 15 illustrates interface 1500 according to some embodiments. Interface 1500 may allow a developer to define Extensibility Mapping Objects (EMOs) for reference field bundles associated with non-modeled consuming business entities. An EMO maintains metadata associating a business object node with a node of a message type. Accordingly, an EMO may facilitate usage of corresponding extension fields within forms and service interfaces.

Figure 16:
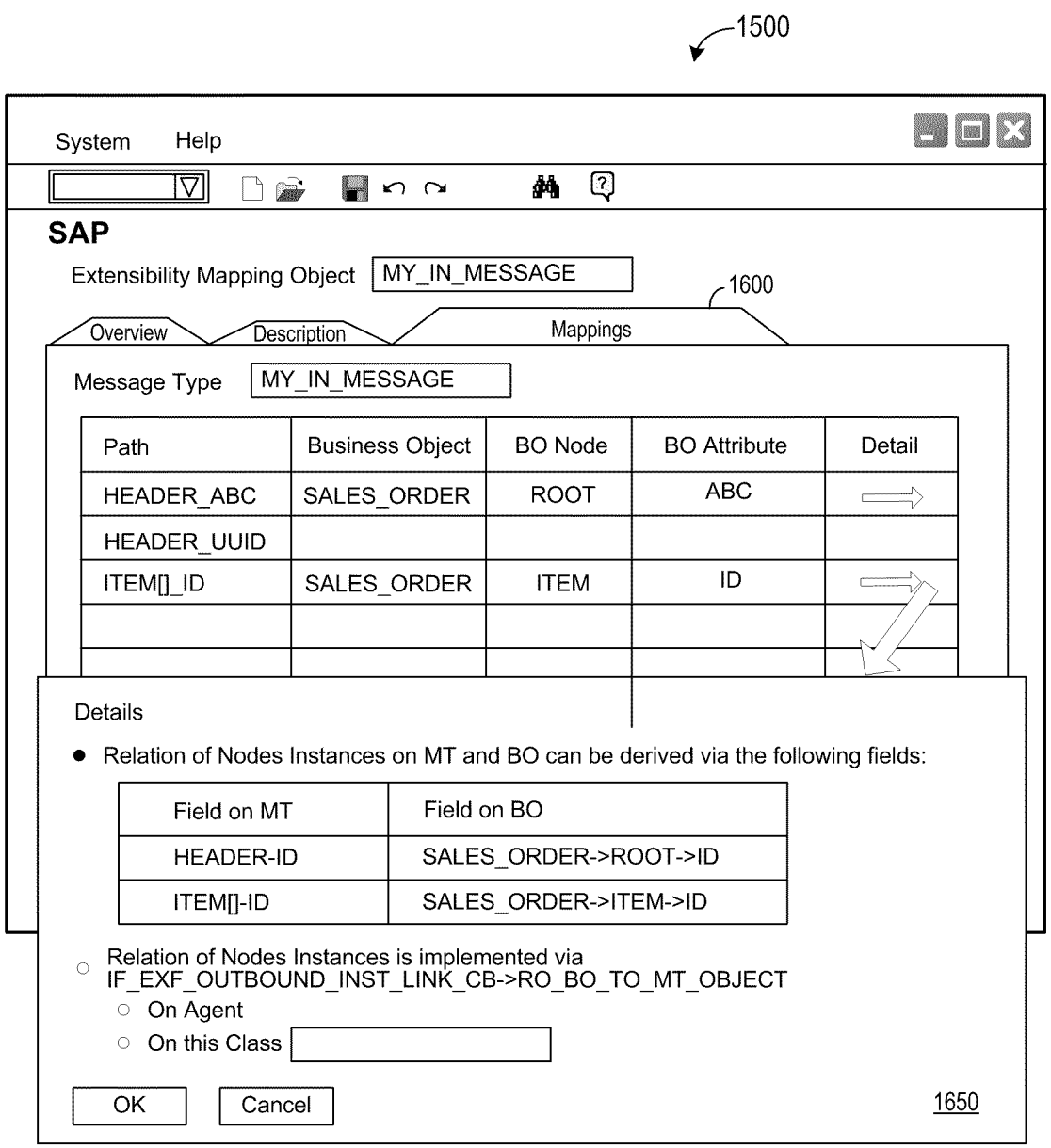
FIG. 16 is a view of a user interface to define an extensibility mapping object according to some embodiments.

FIG. 16 shows tab 1600 of user interface 1500 for specifying the mapping metadata. As shown, each of several paths of the message type MY_IN_MESSAGE is associated with a business object, a business object node, and a business object attribute. Details dialog 1650 associated with each path includes metadata to further specify the instance relationship. As shown, the instance relationship may be described using the model information, or may be returned during runtime by implementing IF_EXF_OUTBOUND_INST_LINK_CB→RO_BO_TO_MT_OBJECT.

This method returns an object from which the following sets of metadata may be collected: 1) BO_name+Node_name+Node_id (to identify a business object node); and 2) Reference to data (to identify a node within the message type). As shown in Details dialog 1650, the method may be implemented either directly on an associated process agent or in a special class.

The embodiments described herein are solely for the purpose of illustration. Those in the art will recognize other embodiments may be practiced with modifications and alterations limited only by the claims.

What is claimed is:

1. A computer-implemented method comprising:
presenting, to a user, a consuming business entity including a reference field of a business object;
receiving an instruction from the user to add an extension field to the consuming business entity based on the reference field of the business object;
after the receiving the instruction from the user to add an extension field to the consuming business entity, determining a second consuming business entity that: (i) is different than the consuming business entity to which the user instructed the extension field be added and (ii) includes the reference field but not the extension field that the user instructed be added to the consuming business entity;
wherein the determining a second consuming business entity that: (i) is different than the consuming business entity to which the user instructed the extension field be added and (ii) includes the reference field but not the extension field that the user instructed be added to the consuming business entity comprises:
analyzing a plurality of reference field bundles, each one of the plurality of reference field bundles: (i) being associated with a respective consuming business entity that is separate from the one of the plurality of reference field bundles and (ii) including a plurality of reference fields that are included in the respective consuming business entity, to identify a reference field bundle that: (i) is separate from the second consuming business entity and (ii) includes the reference field but not the extension field that the user instructed be added to the consuming business entity based on the reference field; and
determining the second consuming business entity that: (i) is different than the consuming business entity to which the user instructed the extension field be added and (ii) includes the reference field but not the extension field that the user instructed be added to the consuming business entity based on the association between the second consuming business entity and the reference field bundle that: (i) is separate from the second consuming business entity and (ii) includes the reference field but not the extension field that the user instructed be added to the consuming business entity based on the reference field;

the method further comprising:

adding the extension field to the second consuming business entity after the determining the second consuming business entity that: (i) is different than the consuming business entity to which the user instructed the extension field be added and (ii) includes the reference field but not the extension field that the user instructed be added to the consuming business entity by analyzing reference field bundles to identify a based on the association between the second consuming business entity and the reference field bundle that: (i) is separate from the second consuming business entity and (ii) includes the reference field but not the extension field that the user instructed be added to the consuming business entity based on the reference field.

2. The computer-implemented method according to claim 1, further comprising:

receiving a second instruction from the user to add the extension field to the second consuming business entity based on the reference field of the business object.

3. The computer-implemented method according to claim 1, wherein the reference field bundle further associates the second consuming business entity with a second reference field of a second business object.

4. The computer-implemented method according to claim 1, further comprising:

determining a third consuming business entity including the reference field of the business object; and presenting the third consuming business entity to the user.

5. The computer-implemented method according to claim 4, wherein determining the third consuming business entity comprises identifying a second reference field bundle associating the third consuming business entity with the reference field of the business object.

6. The computer-implemented method according to claim 1, wherein the consuming business entity is a user interface, and wherein the second consuming business entity is a form.

7. The computer-implemented method according to claim 1, wherein the consuming business entity is a user interface, and wherein the second consuming business entity is a service interface.

8. A non-transitory computer-readable medium having stored thereon program code, the program code executable by a computer to:

present, to a user, a consuming business entity including a reference field of a business object;

receive an instruction from the user to add an extension field to the consuming business entity based on the reference field of the business object;

after the receive an instruction from the user to add an extension field to the consuming business entity based on the reference field of the business object, determine a second consuming business entity that: (i) is different than the consuming business entity to which the user instructed the extension field be added and (ii) includes the reference field but not the extension field that the user instructed be added to the consuming business entity;

wherein the determine a second consuming business entity that: (i) is different than the consuming business entity to which the user instructed the extension field be added and (ii) includes the reference field but not the extension field that the user instructed be added to the consuming business entity comprises:

analysis of a plurality of reference field bundles, each one of the plurality of reference field bundles: (i) being associated with a respective consuming business entity that is separate from the one of the plurality of reference field bundles and (ii) including a plurality of reference fields that are included in the respective consuming business entity, to identify a reference field bundle that: (i) is separate from the second consuming business entity and (ii) includes the reference field but not the extension field that the user instructed be added to the consuming business entity based on the reference field; and determine the second consuming business entity that: (i) is different than the consuming business entity to which the user instructed the extension field be added and (ii) includes the reference field but not the extension field that the user instructed be added to the consuming business entity based on the association between the second consuming business entity and the reference field bundle that: (i) is separate from the second consuming business entity and (ii) includes the reference field but not the extension field that the user instructed be added to the consuming business entity based on the reference field;

the program code further executable by the computer to:

add the extension field to the second consuming business entity after the determination of the second consuming business entity that: (i) is different than the consuming business entity to which the user instructed the extension field be added and (ii) includes the reference field but not the extension field that the user instructed be added to the consuming business entity based on the association between the second consuming business entity and the reference field bundle that: (i) is separate from the second consuming business entity and (ii) includes the reference field but not the extension field that the user instructed be added to the consuming business entity based on the reference field.

9. The non-transitory computer-readable medium according to claim 8, the program code further executable by a computer to:

receive a second instruction from the user to add the extension field to the second consuming business entity based on the reference field of the business object.

10. The non-transitory computer-readable medium according to claim 8, wherein the reference field bundle further associates the second consuming business entity with a second reference field of a second business object.

11. The non-transitory computer-readable medium according to claim 8, the program code further executable by a computer to:

determine a third consuming business entity including the reference field of the business object; and present the third consuming business entity to the user.

12. The non-transitory computer-readable medium according to claim 11, wherein determination of the third consuming business entity comprises identification of a second reference field bundle associating the third consuming business entity with the reference field of the business object.

13. A system comprising:
  a business service provider that includes a computer and is to:
    present, to a user, a consuming business entity including a reference field of a business object;
    receive an instruction from the user to add an extension field to the consuming business entity based on the reference field of the business object;
    after the receive an instruction from the user to add an extension field to the consuming business entity based on the reference field of the business object, determine a second consuming business entity that: (i) is different than the consuming business entity to which the user instructed the extension field be added and (ii) includes the reference field but not the extension field that the user instructed be added to the consuming business entity;
    wherein the determine a second consuming business entity that: (i) is different than the consuming business entity to which the user instructed the extension field be added and (ii) includes the reference field but not the extension field that the user instructed be added to the consuming business entity comprises:
      analysis of a plurality of reference field bundles, each one of the plurality of reference field bundles: (i) being associated with a respective consuming business entity that is separate from the one of the plurality of reference field bundles and (ii) including a plurality of reference fields that are included in the respective consuming business entity, to identify a reference field bundle that: (i) is separate from the second consuming business entity and (ii) includes the reference field but not the extension field that the user instructed be added to the consuming business entity based on the reference field; and
      determine the second consuming business entity that: (i) is different than the consuming business entity to which the user instructed the extension field be added and (ii) includes the reference field but not the extension field that the user instructed be added to the consuming business entity based on the association between the second consuming business entity and the reference field bundle that: (i) is separate from the second consuming business entity and (ii) includes the reference field but not the extension field that the user instructed be added to the consuming business entity based on the reference field;
  the business service provider further to:
    add the extension field to the second consuming business entity after the determination of the second consuming business entity that: (i) is different than the consuming business entity to which the user instructed the extension field be added and (ii) includes the reference field but not the extension field that the user instructed be added to the consuming business entity based on the association between the second consuming business entity and the reference field bundle that: (i) is separate from the second consuming business entity and (ii) includes the reference field but not the extension field that the user instructed be added to the consuming business entity based on the reference field.

14. The system according to claim 13, the business service provider further to:
  receive a second instruction from the user to add the extension field to the second consuming business entity based on the reference field of the business object.

15. The system according to claim 13, wherein the reference field bundle further associates the second consuming business entity with a second reference field of a second business object.

16. The system according to claim 13, the business service provider further to:
  determine a third consuming business entity including the reference field of the business object; and
  present the third consuming business entity to the user.

17. The system according to claim 16,
  wherein determination of the third consuming business entity comprises identification of a second reference field bundle associating the third consuming business entity with the reference field of the business object.

* * * * *